US007139275B1

(12) United States Patent
Vyas

(10) Patent No.: US 7,139,275 B1
(45) Date of Patent: Nov. 21, 2006

(54) PROVIDING DIFFERENTIATED SERVICES ON ATM SWITCHED VIRTUAL CIRCUITS WHEN TRANSPORTING IP PACKETS

(75) Inventor: Pankaj Vyas, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 848 days.

(21) Appl. No.: 09/904,593

(22) Filed: Jul. 16, 2001

(51) Int. Cl.
H04L 12/28 (2006.01)
(52) U.S. Cl. ............ 370/395.52; 370/397; 370/395.21; 370/395.31
(58) Field of Classification Search ...... 370/395.1–401
See application file for complete search history.

(56) References Cited

U.S. PATENT DOCUMENTS

| 5,903,559 | A  | * | 5/1999  | Acharya et al. ............ 370/355 |
|-----------|-----|---|---------|-------------------------------------|
| 6,144,661 | A  | * | 11/2000 | Katsube et al. ............ 370/390 |
| 6,188,689 | B1 | * | 2/2001  | Katsube et al. ............ 370/389 |
| 6,501,760 | B1 | * | 12/2002 | Ohba et al. ............ 370/395.42 |
| 6,618,381 | B1 | * | 9/2003  | Miyamoto et al. ...... 370/395.43   |
| 6,768,738 | B1 | * | 7/2004  | Yazaki et al. ................ 370/392 |
| 6,775,268 | B1 | * | 8/2004  | Wang et al. ................ 370/352 |
| 2001/0032265 | A1 | * | 10/2001 | Tanaka ........................ 709/227 |
| 2004/0213224 | A1 | * | 10/2004 | Goudreau ................... 370/389 |

OTHER PUBLICATIONS

The ATM Forum Technical Committee; Entitled: "UBR with MDCR Addendum to UNI Signalling 4.0,PNNI 1.0 and AINI"; AF-CS-0147.000; Jul. 2000; Available from www.atmforum.com; (64 Pages).

Bernet, et al; Entitled: Request for Comments: 2998- A Framework for Integrated Services Operation over Diffserv Networks; Nov. 2000; Available from www.ietf.org; (31 Pages).
G. Huston; Entitled: Request for Comments: 2990- Next Steps for the IP QoS Architecture; Nov. 2000; Available from www.ietf.org; (24 Pages).
George Lawton, "Building the Internet backbone Take a virtual tour of a busy Network Access Point", pp. 1-7; Sep. 1996.
Gung-Chou Lai and Ruay-Shiung Chang, "Support QoS in IP over ATM", from Computer Communications 22 (1999) 411-418, pp. 1-42, Jun. 2, 1997, Department of Computer Science and Information Engineering, National Dong Hwa University, Hualien, Taiwan.
R. Callon, P. Doolan, N. Feldman, A. Fredette, G. Swallow and A. Viswanathan, "A Framework for Multiprotocol Label Switching" from Internet Draft a Framework for MPLS pp. 1-64, Nov. 21, 1997.
Eric Crawley, Raj Nair, Bala Rajagopalan and Hal Sandick, "A Framework for QoS-based Routing in the Internet", pp. 1-8 May 27, 1998.
Arun Viswanathan, Nancy Feldman, Zheng Wang and Ross Callon, "Evolution of Multi-Protocol Label Switching," pp. 1-12.

* cited by examiner

*Primary Examiner*—Chau Nguyen
*Assistant Examiner*—Michael J. Moore
(74) *Attorney, Agent, or Firm*—Narendra Reddy Thappeta

(57) ABSTRACT

A router providing differentiated services while transporting Internet Protocol (IP) packets on an asynchronous transfer mode (ATM) backbone. A network administrator may specify multiple precedence values (in the type of service (TOS) portion of an IP header) associated with each SVC (set up with desired QOS). IP packets with the specified precedence values are transported on the associated SVC. By associating different precedence values with different SVC and configuring different SVCs with different QOS, differentiated services may be provided to IP packets.

52 Claims, 4 Drawing Sheets

PROVIDING DIFFERENTIATED SERVICES ON ATM SWITCHED VIRTUAL CIRCUITS WHEN TRANSPORTING IP PACKETS

BACKGROUND OF THE INVENTION

1. Field of the Invention

The present invention relates to communication networks, and more specifically to a method and apparatus for providing differentiated services on asynchronous transfer mode (ATM) switched virtual circuits (SVC) when transporting Internet Protocol (IP) packets.

2. Related Art

Internet Protocol (IP) packets are often transported on asynchronous transfer mode (ATM) based communication networks. It is often desirable to transport IP packets using switched virtual circuits (SVCs) at least in that the SVC can be set up and released as and when required, thereby potentially not tying up unused bandwidth and other resources (e.g., buffer space on ATM switches) on the ATM network.

One desirable feature in such ATM networks is that IP packets be provided differentiated services. Differentiated services typically facilitate attempts to transport IP packets consistent with different service requirements for each packet. Thus, at least some of the users (of IP packets) may be provided guaranteed superior services.

A situation where differentiated services using SVCs would be of particular interest is when IP packets specify a desired type of service (TOS) in a corresponding header field. The TOS field is described in further detail in RFC 791 entitled, "Internet Protocol", which is incorporated in its entirety herewith. TOS is specified along the parameters precedence, delay, throughput, and reliability. It would be desirable to transport IP packets on SVCs providing the closest matching services (QOS) when the TOS field is specified for the IP packet. As IP packets may specify different TOS values, it would be desirable to provide differentiated services for IP packets when transporting on SVCs.

What is therefore needed is a method and apparatus which enables differentiated services to be provided to IP packets transported on ATM SVCs.

SUMMARY OF THE INVENTION

Routers in accordance with the present invention provide differentiated services to IP packets. Thus, a router may provision multiple SVCs terminating at another router, with each SVC being set up with potentially different quality of services (QOS). An IP packet is transmitted on one of the SVC depending on the desired services for the IP packet.

In an embodiment, the desired services for an IP packet are determined by examining the precedence values present in the type of service (TOS) field of the IP header. Multiple precedence values can be mapped to (associated with) the same SVC. Thus, as the precedence value may contain 3 bits, up to eight SVCs (with different QOS potentially) may be provisioned between two routers interfacing directly with an ATM backbone.

According to an aspect of the present invention, both routers transport packets having the same precedence value (or desired services in general) on the same SVC. To facilitate such a feature, a router initiating a set up request sends precedence data indicating the specific precedence values which are associated with the SVC being set up (with the request). The router at the other end of the SVC uses the precedence data to transmit packets with the indicated precedence values on the same SVC. In an embodiment, the precedence data is sent in a broadband higher layer information (BHLI) information element (IE) of a signaling set up message.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

The present invention allows differentiated services to be provided to different IP packets using SVCs offering different quality of services (QOS) on an ATM network. Each received packet is assigned to one of the SVCs depending on the services desired for the packet. The services desired for a packet may be determined, for example, by examining the type of service (TOS) field of the IP packets. In an embodiment, an edge router setting up a SVC communicates with another edge router (at the other end of the SVC) to ensure that similar packets receive the same QOS when transported in the reverse direction also.

The invention is described below with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in other environments.

2. Example Environment

Figure 1:
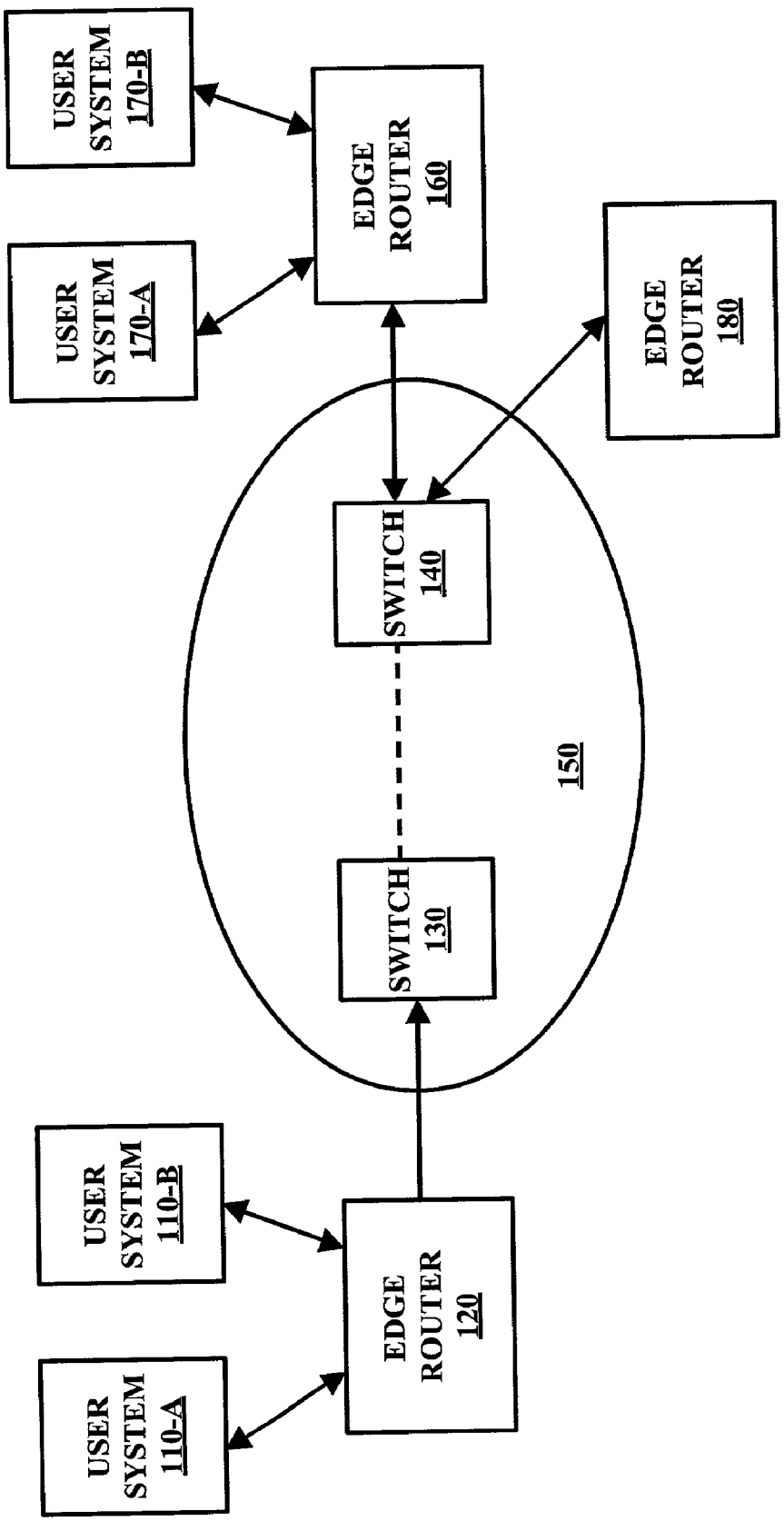
FIG. 1 is a block diagram illustrating an example environment in which the present invention can be implemented.

FIG. 1 is a block diagram illustrating an example environment in which the present invention can be implemented. The environment is shown containing user systems 110-A, 110-B, 170-A and 170-B, edge routers 120, 160 and 180, and switches 130 and 140 in ATM backbone 150. The environment is shown containing a few representative components only for illustration. In reality, each environment typically contains many more components. Each component is described below in further detail.

User systems 110-A, 110-B communicate with user systems 170-A and 170-B using ATM backbone 150. Each user system (e.g., 110-A) interfaces with the connected (e.g., user system 110-A is shown connected to edge router 120) edge router(s) using a protocol such as Internet Protocol (IP). Each user system may correspond to a computer system or workstation, and can be implemented in a known way.

ATM backbone 150 is shown containing switches 130 and 140. Switches 130 and 140 operate consistent with the ATM protocol, and may be implemented in a known way. In general, switches enable edge router 120 to set up and release SVCs. The SVC can be set up with different QOS as specified by edge router 120 during set up time.

Edge router 120 interfaces with user systems 110-A and 110-B using IP protocol, and with switch 130 using ATM. Edge router 120 enables differentiated services to be provided to the IP packets as described below in further detail.

3. Method

Figure 2:
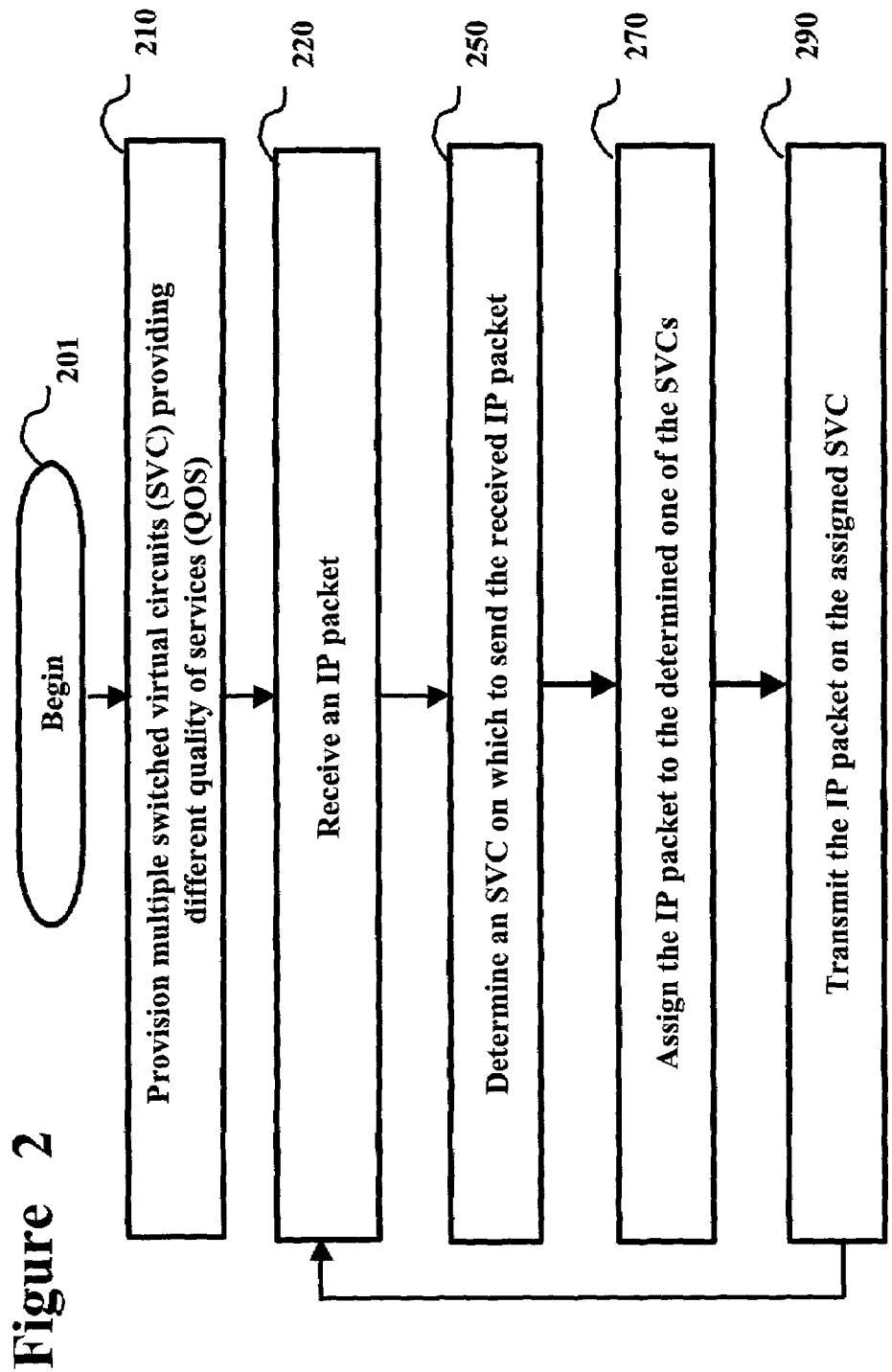
FIG. 2 is a flow chart illustrating a method in accordance with the present invention.

FIG. 2 is a flow chart depicting a method in accordance with the present invention. The method is described with reference to edge router 120 of FIG. 1 for illustration. However, the present invention may be performed in other edge routers and environments also. The method starts in step 201, in which control immediately passes to step 210.

In step 210, edge router 120 provisions multiple SVCs, with each SVC being designed to provide different quality of services (QOS). In an embodiment described below in the context of IP packets (received from edge routers), a network administrator specifies a SVC (and associated QOS) associated with different type of service (TOS) value(s) specified by an IP packet. Multiple TOS values may be assigned to the same SVC. In that embodiment, an SVC is provisioned only when necessitated by the reception of IP packets with the corresponding TOS value as described in below section(s).

In step 220, edge router 120 receives an IP packet from user system 110-A or 110-B. For purposes of the description of the method, it is assumed that the SVC which can provide the services required for the received packet is already provisioned for processing the received IP packet. In step 250, edge router 120 determines the specific one of the potentially several SVCs on which to send the packet. In an embodiment described below, the determination entails examination of the TOS field of the received packet and mapping the value in the field to a SVC providing compatible QOS.

In step 270, edge router 120 assigns the received packet to the determined one of the SVCs. The packet is then transported on the assigned VC in step 290. Steps 270 and 290 may be performed in a known way. Thus, the method of FIG. 2 enables IP packets to be transported on SVCs providing different QOS. The implementation of the method is described in further detail with reference to FIG. 3.

4. Edge Router

Figure 3:
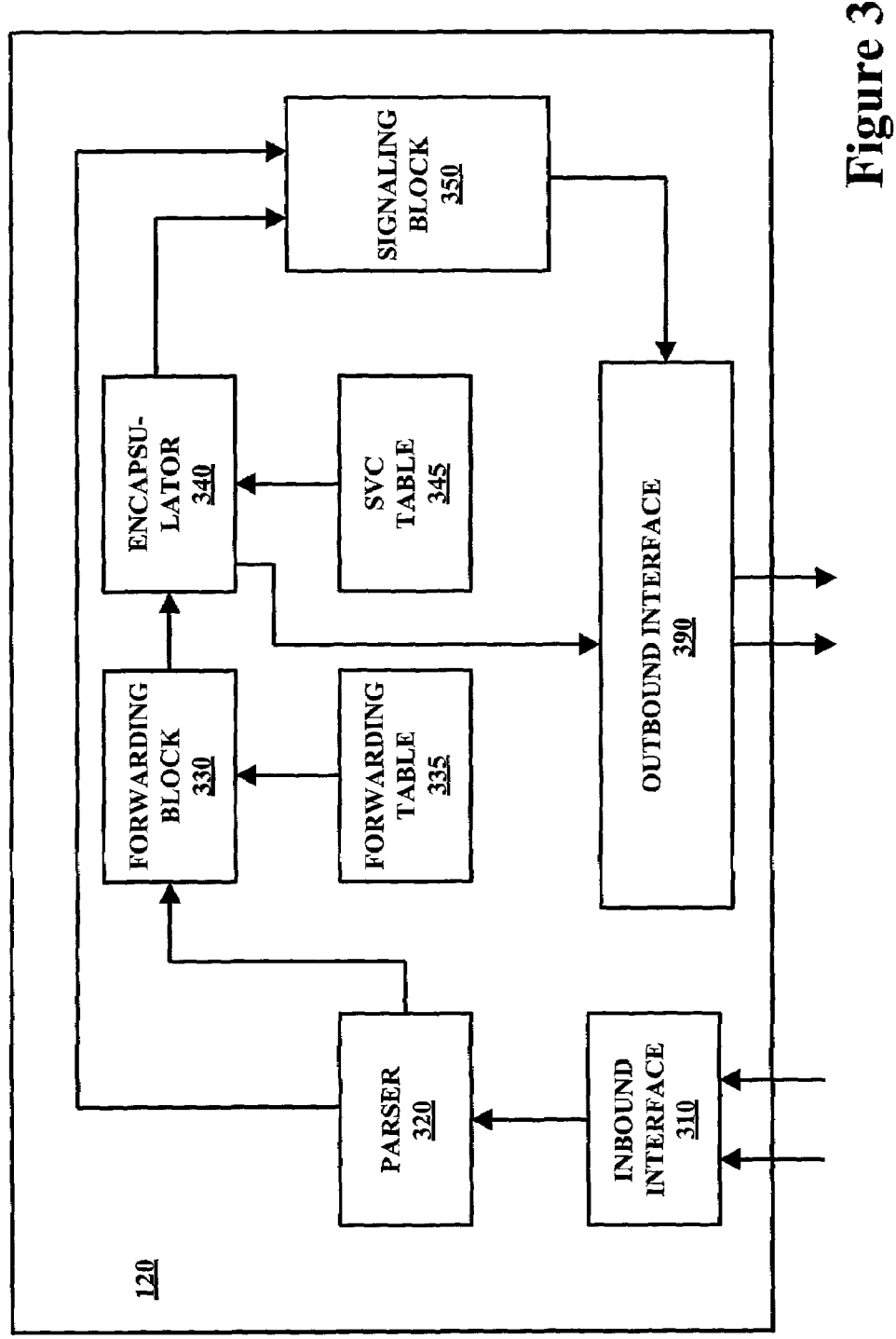
FIG. 3 is a block diagram illustrating the internals of an edge router provided in accordance with the present invention.

FIG. 3 is a block diagram illustrating the internals of edge router 120 as relevant to processing of IP packets in an embodiment of the present invention. Edge router 120 is shown containing inbound interface 310, parser 320, forwarding block 330, encapsulator 340, signaling block 350, and outbound interface 390. Each component is described below in further detail assuming that an IP packet destined to user system 170-A is received by edge router 120.

Inbound interface 310 provides the electrical and other protocol interfaces necessary to receive bits forming packets from various paths. Inbound interface 310 assembles each packet and forwards the packets to parser 320. Outbound interface 390 provides the electrical and other protocol interfaces to send packets to other blocks. Inbound interface 310 and output bound interface 390 may be implemented in a known way.

Parser 320 examines each received packet (IP or ATM cell), and forwards the packet to the appropriate next component in the processing path. If the packet is to be forwarded on ATM backbone 150, the packet is sent to forwarding block 330. On the other hand, if the packet relates to signaling (call set up, release, etc.), the packet is forwarded to signaling block 350.

Forwarding block 330 determines the forwarding information (typically including a output port or interface and an IP address of the edge router at the next IP hop) of each packet, usually based on a destination IP address. The entries in forwarding table 335 may be examined for such a determination. Forwarding table 335 may be populated by using routing protocols well known in the relevant arts. For purposes of illustration, it is assumed that a received packet is to be forwarded on ATM backbone.

SVC table 345 contains information on a specific SVC on which each received IP packet is to be forwarded. In an embodiment, SVC table 345 is organized as follows:

TABLE I

| IP Address | NSAP | Precedence Value | SVC Identifier | SVC Parameters | SVC Status |
|---|---|---|---|---|---|
|  |  |  |  |  |  |
|  |  |  |  |  |  |

In Table I, IP Address represents the IP address of the edge router in the next hop. NSAP (Network service access point) uniquely identifies the edge router at the next hop. TOS value represents the precedence value(s) in the TOS field. SVC identifier indicates the identifier of the SVC. SVC parameters specify the QOS to be provided to the IP packets represented by the TOS value entry. SVC status field indicates the status (active call, released, etc.) of the corresponding SVC.

A network administrator may manually configure the IP address, NSAP, TOS value and SVC parameters, and the remaining columns are populated during operation as described below. Due to the configuration of the SVC table, desired services can be provided to IP packets based on the precedence values. It should be understood that other fields of the IP packet (including different portions within the TOS field) can be used to determine the service desired and the QOS to be offered without departing from the scope and spirit of the present invention.

Encapsulator 340 receives the IP address of the edge router in the next and the IP packet which is to be transmitted on ATM backbone 150. Encapsulator 340 sends the TOS value of a received packet and received IP address as a key to SVC table 345 to receive the corresponding row. The row specifies the SVC on which to send the received packet and the NSAP. The specific SVC may or may not be active (set up and not released). If the SVC is active, the data in the IP packet is encapsulated and sent on the SVC consistent with the ATM protocol in a known way.

If the SVC is not active, encapsulator 340 interfaces with signaling block 350 to cause the SVC to be set up. The SVC is caused to set up only upon the reception of a first IP packet. Once the SVC is set up, encapsulator 340 sends the IP packet on the SVC consistent with the ATM protocol. The SVC may be released depending on the parameters (e.g., idle time=10 seconds) set up in SVC table 345. The manner in which an embodiment of signaling block 350 causes a SVC to be set up is described below.

5. Signaling Block

Signaling block 350 operates to initiate the set up of a SVC, and also to cooperate when a set up request is received from another edge router. The set up request is forwarded to signaling block 350 by encapsulator 340. The manner in which signaling block 350 initiates the setting up of a SVC is described first. The manner in which a set up request is processed is described later.

With respect to initiating a set up request, the SVC may be set up using well known protocols such as UNI (User Network Interface) 3.1 or 4.0. Only the details of UNI 3.1 as relevant to an understanding of the described embodiments are provided in the subject patent application. For further details on UNI 3.1, the reader is referred to a document entitled, "ATM User-Network Interface Specification V3.1" available from The ATM Forum, and is incorporated in its entirety into the present application.

One desirable feature in setting up an SVC is that the same type of packets in the return direction also be transferred on the same SVC. Accordingly, it may be necessary to send information on the specific precedence/TOS values which have been assigned to the SVC presently sought to be set up. The information may be referred to as precedence data.

In one embodiment, broadband higher layer information (BHLI) information element (IE) is used to communicate the related information. As is well known, an SVC create (set up) request is accompanied by several information elements, and BHLI is one such IE. BHLI IE contains a vendor specific field, and the IE can be used to communicate the precedence information. For example, to communicate that precedence values of 0, 3, and 7 are to be associated with the SVC presently being set up, a signaling set up message (using VPI:0, VCI:5 for the cells) may contain the following IE:

Byte 1: Type of IE: Value=0×3 for vendor specific BHLI IE;

Byte 2 to 4: Vendor Identifier: 0×0000C0 for Cisco System, Inc. (the assignee of the subject application);

Byte 5 to 6: Application Identifier: 0×AABB for SVC Bundle; and

Byte 7: Precedence byte (0×91).

Thus, a signaling set up message with the above content may be sent to set up an SVC. As noted above, SVCs may be set up only when necessary (e.g., when a first packet for the SVC is received). The manner in which a receiving edge router processes the signaling set up message is described assuming that edge router 120 receives a signaling set up message from another edge router.

Parser 320 passes the ATM cells with a SVC set up request (signaling set up message) to signaling block 350. Signaling block 350 examines the cells consistent with the format above to determine that IP packets having precedence values (byte 7 of the IE in the example) of 0, 3 and 7 are to be transmitted on the SVC being set up. Signaling block 350 populates SVC table 345 to indicate the corresponding information. If inconsistent information (e.g., the precedence values are assigned to other VCs) is found or the set up request cannot be accepted for other reasons, signaling block 350 rejects the set up request.

If the SVC set up request is accepted, a confirmation is sent to the edge router (initiating edge router) initiating the request. The SVC table at the initiating edge router is updated to reflect the active status of the SVC. Thus, the SVC tables in both edge routers may be updated to reflect the set up of the new SVC and the IP packets which are to be transported on the new SVC. Once setup, the SVC continues to be active until released. The release may be triggered by events such as extended periods of inactivity. As a result, bandwidth and other resources (e.g., buffers in other switches) are optimally utilized.

It should be understood that each feature of the present invention can be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing edge router 120 with a desired mix of hardware, software and/or firmware. An embodiment implemented substantially in software is described below.

6. Software Implementation

Figure 4:
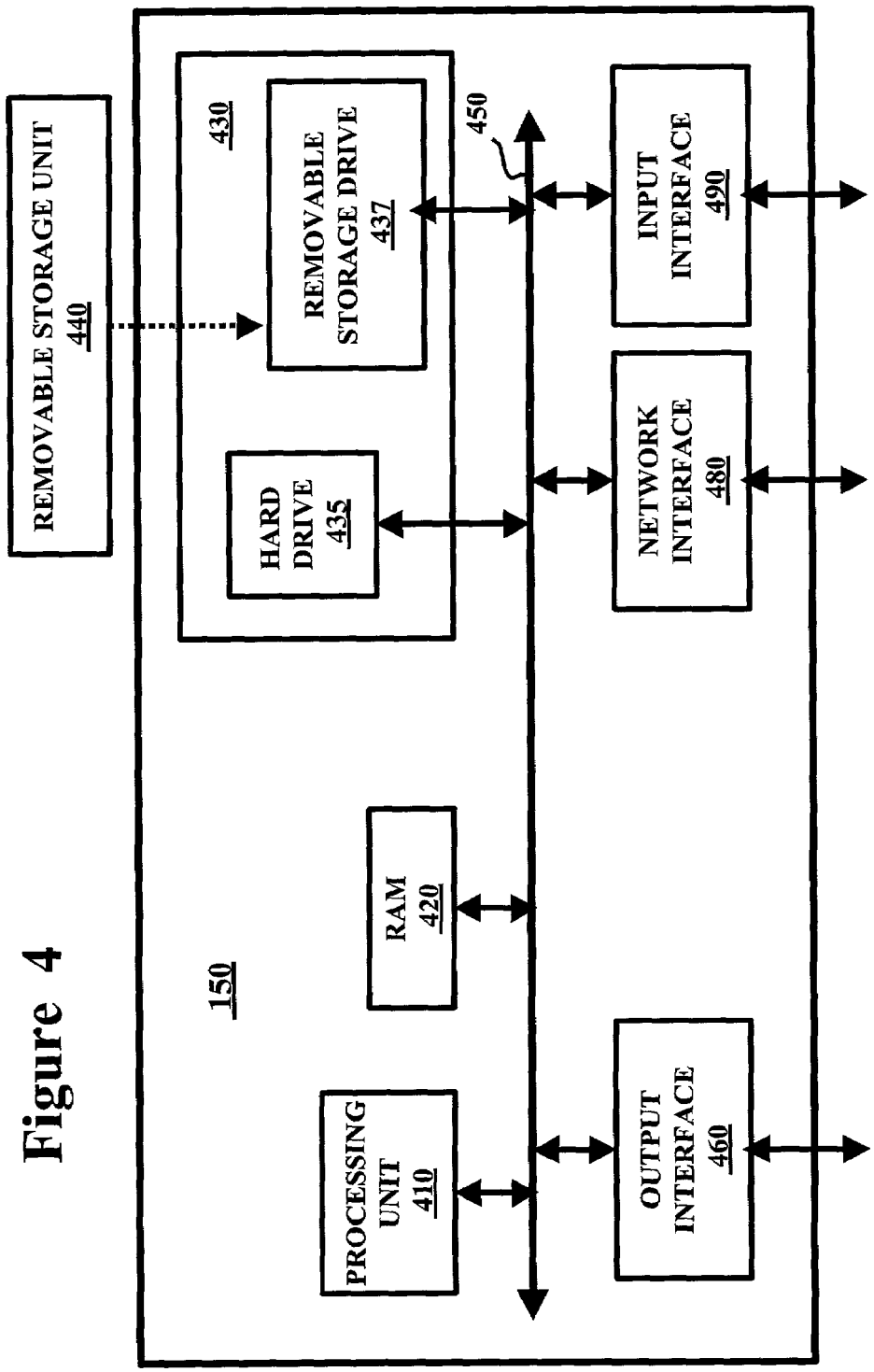
FIG. 4 is a block diagram illustrating an embodiment of the present invention implemented substantially in the form of software.

FIG. 4 is a block diagram illustrating the details of edge router 120 in one embodiment. Edge router 120 is shown containing processing unit 410, random access memory (RAM) 420, storage 430, output interface 460, network interface 480 and input interface 490. Each component is described in further detail below.

Output interface 460 provides output signals (e.g., display signals to a display unit, not shown) which can form the basis for a suitable user interface for an administrator to interact with edge router 120. Input interface 490 (e.g., interface with a key-board and/or mouse, not shown) enables an administrator to provide any necessary inputs to edge router 120. Output interface 460 and input interface 490 can be used, for example, to enable a network administrator to specify the SVCs, SVC parameters, and the specific precedence values to assigned to each SVC.

Network interface 480 enables edge router 120 to send and receive data on communication networks using asynchronous transfer mode (ATM) and internet protocol (IP). Network interface 480 may correspond to inbound interface 310 and outbound interface 390 of FIG. 3. Network interface 480, output interface 460 and input interface 490 can be implemented in a known way.

RAM 430 and storage 430 may together be referred to as a memory. RAM 430 receives instructions and data on path 450 from storage 430. Secondary memory 430 may contain units such as hard drive 435 and removable storage drive 437. Secondary storage 430 may store the software instructions and data, which enable edge router 120 to provide several features in accordance with the present invention.

Some or all of the data and instructions may be provided on removable storage unit 440, and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420. In general processing unit 410 reads sequences of instructions from various types of memory medium (including RAM 420, storage 430 and removable storage unit 440), and executes the instructions to provide various features of the present invention.

Embodiments according to FIG. 4 can be used to provide differentiated services for IP packets.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of providing differentiated services for IP packets transported on an asynchronous transfer mode (ATM) backbone, said method comprising:

provisioning a first switched virtual circuit (SVC) and a second SVC on said ATM backbone, each of said first SVC and said second SVC being provisioned as a unicast point-to-point virtual circuit terminating between same end devices;

receiving an IP packet;

determining whether to send said IP packet on said first SVC or said second SVC according to services desired to be provided for said IP packet, wherein said determining comprises examining a header of said IP packet and wherein said services desired for said IP packet being based on said header, said determining also comprising maintaining a data structure indicating a specific one of said first SVC and said second SVC on which to send IP packets having a specific precedence value in a type of service (TOS) field in said header; and sending said IP packet on the determined one of said first SVC or said second SVC, wherein said IP packet is sent on either said first SVC or said second SVC according to the data stored in said data structure.

2. The method of claim 1, wherein said data structure comprises a table.

3. The method of claim 2, wherein said table indicates that a plurality of precedence values are to be mapped to the same SVC.

4. The method of claim 2, wherein said provisioning comprises initiating a set up request from a first router to a second router to set up said first SVC, wherein said first router and said second router interface directly with said ATM backbone, wherein said set up request is sent only after reception of a first IP packet to be sent on said first SVC, wherein said first SVC is provisioned between said first router and said second router.

5. The method of claim 4, wherein said second router also sends on said first SVC the IP packets having the same precedence value as said first IP packet.

6. The method of claim 5, further comprising sending a precedence data from said first router to said second router, wherein said precedence data indicates that the precedence value of said first IP packet is to be associated with said first SVC such that said second router can send packets with the same precedence value on said first SVC.

7. The method of claim 6, wherein said precedence data is contained in a signaling set up message representing said set up request.

8. The method of claim 7, wherein said precedence data is encoded in a broadband higher layer information (BHLI) information element (IE) contained in said signaling set up message.

9. The method of claim 8, wherein each of said first router and said second router comprises an edge router.

10. The method of claim 4, wherein said table stores an IP address, a network service access point (NSAP) of said second router, a precedence value contained in said header, and a SVC identifier in each row.

11. A router for providing differentiated services for IP packets transported on an asynchronous transfer mode (ATM) backbone, said router comprising:

means for provisioning a first switched virtual circuit (SVC) and a second SVC on said ATM backbone, each of said first SVC and said second SVC being provisioned as a unicast point-to-point virtual circuit terminating between same end devices;

means for receiving an IP packet;

means for determining whether to send said IP packet on said first SVC or said second SVC according to services desired to be provided for said IP packet, wherein said means for determining examines a header of said IP packet to determine whether to send said IP packet on said first SVC or said second SVC and wherein said services desired for said IP packet being based on said header, wherein said means for determining further maintains a data structure indicating a specific one of said first SVC and said second SVC on which to send IP packets having a specific precedence value in a type of service (TOS) field in said header; and means for sending said IP packet on the determined one of said first SVC or said second SVC, wherein said IP packet is sent on either said first SVC or said second SVC according to the data stored in said data structure.

12. The router of claim 11, wherein said data structure comprises a table.

13. The router of claim 12, wherein said table indicates that a plurality of precedence values are to be mapped to the same SVC.

14. The router of claim 12, wherein said means for provisioning initiates a set up request to another router to set up said first SVC, wherein said set up request is sent only after reception of a first IP packet to be sent on said first SVC, wherein said first SVC is provisioned to terminate at said another router.

15. The router of claim 14, wherein said another router also sends on said first SVC the IP packets having the same precedence value as said first IP packet.

16. The router of claim 15, further comprising means for sending a precedence data to said another router, wherein said precedence data indicates that the precedence value of said first IP packet is to be associated with said first SVC such that another router can send packets with the same precedence value on said first SVC.

17. The router of claim 16, wherein said precedence data is encoded in a broadband higher layer information (BHLI) information element (IE) contained in a Signaling set up message.

18. A computer readable medium carrying one or more sequences of instructions for causing a router to provide differentiated service to IP packets transported on an asynchronous transfer mode (ATM) backbone, wherein execution of said one or more sequences of instructions by one or more processors contained in said router causes said one or more processors to perform the actions of:

provisioning a first switched virtual circuit (SVC) and a second SVC on said ATM backbone, each of said first SVC and said second SVC being provisioned as a unicast point-to-point virtual circuit terminating between same end devices;

receiving an IP packet;

determining whether to send said IP packet on said first SVC or said second SVC according to services desired to be provided for said IP packet, wherein said determining comprises examining a header of said IP packet and wherein said services desired for said IP packet being based on said header, wherein said determining further comprises maintaining a data structure indicating a specific one of said first SVC and said second SVC on which to send IP packets having a specific precedence value in a type of service (TOS) field in said header; and sending said IP packet on the determined one of said first SVC or said second SVC, wherein said IP packet is sent on either said first SVC or said second SVC according to the data stored in said data structure.

19. The computer readable medium of claim 18, wherein said data structure comprises a table.

20. The computer readable medium of claim 19, wherein said table indicates that a plurality of precedence values are to be mapped to the same SVC.

21. The computer readable medium of claim 19, wherein said provisioning comprises initiating a set up request to another router to set up said first SVC, wherein said first router and said another router interface directly with said ATM backbone, wherein said set up request is sent only after reception of a first IP packet to be sent on said first SVC, wherein said first SVC is provisioned between said first router and said another router.

22. The computer readable medium of claim 21, wherein said another router also sends on said first SVC the IP packets having the same precedence value as said first IP packet.

23. The computer readable medium of claim 22, further comprising sending a precedence data to said another router, wherein said precedence data indicates that the precedence value of said first IP packet is to be associated with said first SVC such that another router can send packets with the same precedence value on said first SVC.

24. The computer readable medium of claim 23, wherein said precedence data is encoded in a broadband higher layer information (BHLI) information element (IE) contained in a signaling set up message.

25. The computer readable medium of claim 23, wherein said table stores an IP address, a network service access point (NSAP) of said second router, a precedence value contained in said header, and a SVC identifier in each row.

26. A router for providing differentiated services for IP packets transported on an asynchronous transfer mode (ATM) backbone, said router comprising:

an inbound interface receiving an IP packet;

a memory storing a data structure indicating that a first switched virtual circuit (SVC) and a second SVC are provisioned on said ATM backbone, each of said first SVC and said second SVC being provisioned as a unicast point-to-point virtual circuit terminating between same end devices;

an encapsulator determining whether to send said IP packet on said first SVC or said second SVC according to services desired to be provided for said IP packet, said encapsulator generating a plurality of cells designed for transmission on the determined one of said first SVC or said second SVC, wherein said ATM encapsulator examines a header of said IP packet to determine whether to send said IP packet on said first SVC or said second SVC and wherein said services desired for said IP packet being based on said header, wherein said data structure indicates a specific one of said first SVC and said second SVC on which to send IP packets having a specific precedence value in a type of service (TOS) field in said header; and an output interface sending said plurality of cells on said ATM backbone.

27. The router of claim 26, wherein said data structure comprises a table.

28. The router of claim 27, wherein said table indicates that a plurality of precedence values are to be mapped to the same SVC.

29. The router of claim 28, further comprising a signaling block for initiating a set up request to another router to set up said first SVC, wherein said set up request is sent only after reception of a first IP packet to be sent on said first SVC, wherein said first SVC is provisioned to terminate at said another router.

30. The router of claim 29, wherein said another router also sends on said first SVC the IP packets having the same precedence value as said first IP packet.

31. The router of claim 30, wherein said signaling block sends a precedence data to said another router, wherein said precedence data indicates that the precedence value of said first IP packet is to be associated with said first SVC such that another router can send packets with the same precedence value on said first SVC.

32. The router of claim 31, wherein said precedence data is encoded in a broadband higher layer information (BHLI) information element (IE) contained in a signaling set up message.

33. The router of claim 27, wherein said SVC table stores a network service access point (NSAP) address and IP address of an edge router at the next hop associated with each SVC, wherein said encapsulator sending as a key to said table a IP address of an edge router at the next hop and a precedence value in each received IP packet to determine whether to send said IP packet on said first SVC or said second SVC.

34. The method of claim 1, wherein said ATM backbone comprises a plurality of switches, wherein said provisioning includes at least one additional switch between said same end devices for said first SVC, wherein said additional switch is contained in said plurality of switches.

35. The router of claim 11, wherein said ATM backbone comprises a plurality of switches, wherein said means for provisioning includes at least one additional switch between said same end devices for said first SVC, wherein said additional switch is contained in said plurality of switches.

36. The computer readable medium of claim 18, wherein said ATM backbone comprises a plurality of switches, wherein said provisioning includes at least one additional switch between said same end devices for said first SVC, wherein said additional switch is contained in said plurality of switches.

37. The router of claim 26, wherein said ATM backbone comprises a plurality of switches, wherein said first SVC contains at least one additional switch between said same end devices, wherein said additional switch is contained in said plurality of switches.

38. A method of providing differentiated services for IP packets transported on an asynchronous transfer mode (ATM) backbone, said method comprising:
provisioning a first switched virtual circuit (SVC) and a second SVC on said ATM backbone, each of said first SVC and said second SVC being provisioned as a unicast point-to-point virtual circuit terminating between same end devices,
receiving an IP packet;
storing in each row of a table an IP address, a network service access point (NSAP) of a second router comprised in said end devices, a precedence value contained in a header in said IP packet, and a SVC identifier;
determining whether to send said IP packet on said first SVC or said second SVC according to services desired to be provided for said IP packet and the content of the rows of said table, wherein said determining comprises examining said header of said IP packet and wherein said services desired for said IP packet being based on said header, a row of said table indicating a specific one of said first SVC and said second SVC on which to send IP packets having a specific precedence value in a type of service (TOS) field in said header; and
sending said IP packet on the determined one of said first SVC or said second SVC, wherein said IP packet is sent on either said first SVC or said second SVC according to the data stored in said table.

39. The method of claim 38, wherein said table indicates that a plurality of precedence values are to be mapped to the same SVC.

40. The method of claim 38, wherein said provisioning comprises initiating a set up request from a first router comprised in said end devices to said second router to set up said first SVC, wherein said first router and said second router interface directly with said ATM backbone, wherein said set up request is sent only after reception of a first IP packet to be sent on said first SVC, wherein said first SVC is provisioned between said first router and said second router.

41. The method of claim 40, wherein said second router also sends on said first SVC the IP packets having the same precedence value as said first IP packet.

42. The method of claim 41, further comprising sending a precedence data from said first router to said second router, wherein said precedence data indicates that the precedence value of said first IP packet is to be associated with said first SVC such that said second router can send packets with the same precedence value on said first SVC.

43. A computer readable medium carrying one or more sequences of instructions for causing a router to provide differentiated services to IP packets transported on an asynchronous transfer mode (ATM) backbone, wherein execution of said one or more sequences of instructions by one or more processors contained in said router causes said one or more processors to perform the actions of:
provisioning a first switched virtual circuit (SVC) and a second SVC on said ATM backbone, each of said first SVC and said second SVC being provisioned as a unicast point-to-point virtual circuit terminating between said router and another router,
receiving an IP packet;
storing in each row of a table an IP address, a network service access point (NSAP) of said another router, a precedence value contained in a header in said IP packet, and a SVC identifier;
determining whether to send said IP packet on said first SVC or said second SVC according to services desired to be provided for said IP packet and the content of the rows of said table, wherein said determining comprises examining said header of said IP packet and wherein said services desired for said IP packet being based on said header, a row of said table indicating a specific one of said first SVC and said second SVC on which to send IP packets having a specific precedence value in a type of service (TOS) field in said header; and
sending said IP packet on the determined one of said first SVC or said second SVC, wherein said IP packet is sent on either said first SVC or said second SVC according to the data stored in said table.

44. The computer readable medium of claim 43, wherein said table indicates that a plurality of precedence values are to be mapped to the same SVC.

45. The computer readable medium of claim 43, wherein said provisioning comprises initiating a set up request from said router to said another router to set up said first SVC, wherein said router and said another router interface directly with said ATM backbone, wherein said set up request is sent only after reception of a first IP packet to be sent on said first SVC, wherein said first SVC is provisioned between said router and said another router.

46. The computer readable medium of claim 45, wherein said another router also sends on said first SVC the IP packets having the same precedence value as said first IP packet.

47. The computer readable medium of claim 46, further comprising sending a precedence data from said router to said another router, wherein said precedence data indicates that the precedence value of said first IP packet is to be associated with said first SVC such that said another router can send packets with the same precedence value on said first SVC.

48. A router for providing differentiated services for IP packets transported on an asynchronous transfer mode (ATM) backbone, said router comprising:
an inbound interface receiving an IP packet;
a memory storing a table, each row of said table storing an IP address, a network service access point (NSAP) of another router, a precedence value contained in a header in said IP packet, and a SVC identifier in each row, said table indicating that a first switched virtual circuit (SVC) and a second SVC are provisioned on said ATM backbone, each of said first SVC and said second SVC being provisioned as a unicast point-to-point virtual circuit terminating between said router and said another router;
an encapsulator determining whether to send said IP packet on said first SVC or said second SVC according to services desired to be provided for said IP packet, said encapsulator generating a plurality of cells designed for transmission on the determined one of said first SVC or said second SVC, wherein said ATM encapsulator examines said header of said IP packet to determine whether to send said IP packet on said first SVC or said second SVC and wherein said services desired for said IP packet being based on said header, wherein said table indicates a specific one of said first SVC and said second SVC on which to send IP packets having a specific precedence value in a type of service (TOS) field in said header; and an output interface sending said plurality of cells on said ATM backbone.

49. The router of claim 48, wherein said table indicates that a plurality of precedence values are to be mapped to the same SVC.

50. The router of claim 48, further comprising a signaling block for initiating a set up request to said another router to set up said first SVC, wherein said set up request is sent only after reception of a first IP packet to be sent on said first SVC, wherein said first SVC is provisioned to terminate at said another router.

51. The router of claim 50, wherein said another router also sends on said first SVC the IP packets having the same precedence value as said first IP packet.

52. The router of claim 51, wherein said signaling block sends a precedence data to said another router, wherein said precedence data indicates that the precedence value of said first IP packet is to be associated with said first SVC such that said another router can send packets with the same precedence value on said first SVC.

* * * * *